(12) United States Patent
David et al.

(10) Patent No.: US 12,181,373 B2
(45) Date of Patent: Dec. 31, 2024

(54) DUCT SHUT-OFF DEVICE PROVIDED WITH A MEASURING DEVICE COMPRISING A TRANSMITTER

(71) Applicant: A. RAYMOND ET CIE, Grenoble (FR)

(72) Inventors: Matthieu David, Saint-Egreve (FR); Olivier Bizzini, Quaix-en-char-treuse (FR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 17/754,689

(22) PCT Filed: Sep. 28, 2020

(86) PCT No.: PCT/FR2020/051689
§ 371 (c)(1),
(2) Date: Apr. 8, 2022

(87) PCT Pub. No.: WO2021/069812
PCT Pub. Date: Apr. 15, 2021

(65) Prior Publication Data
US 2024/0094083 A1     Mar. 21, 2024

(30) Foreign Application Priority Data
Oct. 10, 2019   (FR) ...................................... 1911280

(51) Int. Cl.
*G01M 3/02* (2006.01)
*E03B 7/00* (2006.01)

(52) U.S. Cl.
CPC ............. *G01M 3/022* (2013.01); *E03B 7/003* (2013.01)

(58) Field of Classification Search
None
See application file for complete search history.

(56) References Cited

U.S. PATENT DOCUMENTS 7,387,012 B2 * 6/2008 Spaolonzi ............. G01M 3/047
  138/104
8,942,401 B2 * 1/2015 Murayama ............... H04M 1/03
  73/592

(Continued)

FOREIGN PATENT DOCUMENTS

CN   213513221       10/2020
DE   202016003401 U1 *  7/2016 ............ F16L 41/008

(Continued)

OTHER PUBLICATIONS

International Search Report for Application No. PCT/FR2020/051689 dated Dec. 14, 2020, 2 pages.

(Continued)

*Primary Examiner* — Peter J Macchiarolo
*Assistant Examiner* — Jermaine L Jenkins
(74) *Attorney, Agent, or Firm* — TraskBritt (57) ABSTRACT

Shut-off device for a duct, in which a measuring device comprising a transmitter is housed, the shut-off device comprising: a connecting ring formed of a peripheral wall and an inner rim, which is at least present on one section of the periphery of the peripheral wall and defines a housing for accommodating at least part of the transmitter; a cover configured to close the duct and clip onto the connecting ring and thus rigidly connect the transmitter of the measuring device to the shut-off device.

20 Claims, 5 Drawing Sheets

(56) References Cited

U.S. PATENT DOCUMENTS

| | | | |
|---|---|---|---|
| 10,283,857 B2* | 5/2019 | Ortiz | H01Q 21/28 |
| 10,305,178 B2* | 5/2019 | Gibson | H01Q 1/42 |
| 11,400,328 B2* | 8/2022 | Sitnikov | G08C 17/02 |
| 2013/0036796 A1 | 2/2013 | Fleury, Jr. et al. | |
| 2017/0237158 A1 | 8/2017 | Gibson et al. | |

FOREIGN PATENT DOCUMENTS

| | | |
|---|---|---|
| EP | 0777076 A1 | 6/1997 |
| JP | 2015-143442 A | 8/2015 |

OTHER PUBLICATIONS

International Written Opinion for Application No. PCT/FR2020/051689 dated Dec. 14, 2020, 5 pages.

\* cited by examiner

DUCT SHUT-OFF DEVICE PROVIDED WITH A MEASURING DEVICE COMPRISING A TRANSMITTER

CROSS-REFERENCE TO RELATED APPLICATIONS

This application is a national phase entry under 35 U.S.C. § 371 of International Patent Application PCT/FR2020/051689, filed Sep. 28, 2020, designating the United States of America and published as International Patent Publication WO 2021/069812 A1 on Apr. 15, 2021, which claims the benefit under Article 8 of the Patent Cooperation Treaty to French Patent Application Serial No. 1911280, filed Oct. 10, 2019.

TECHNICAL FIELD

The present disclosure relates to a shut-off device, such as a plug for a valve box, for a duct, in which a measuring device comprising a transmitter is housed. It more specifically relates to the field of pipe monitoring, for example, with a view to detecting fluid leaks.

BACKGROUND

In order to properly manage a fluid distribution network, pipe monitoring is a necessary operation for locating any fluid leaks and targeting maintenance operations. This is particularly the case for the water distribution network.

Devices for measuring water leaks are known that use an acoustic or electroacoustic exploration technique. This technique involves listening to the noise emitted by the circulation of water in a pipe through, for example, a microphone brought into the vicinity of the pipe. The presence of a water leak produces ultrasound that the measuring device can detect in order to locate the leak. This measuring device is generally operated by a technician, who probes the ground while moving in order to try to locate the leaks. Such a solution does not allow real-time and large-scale monitoring of a pipe network to be ensured.

Autonomous measuring devices are also known, disposed in the immediate vicinity of the pipes being monitored, typically at the bottom of the access ducts to these pipes (the access of which is protected by a valve box). These measuring devices are capable of communicating remotely. For this reason, the measuring devices can be provided with a communication device, such as a radio frequency transmitter. Relay antennas are generally disposed in the vicinity of the measuring devices for receiving the measured and transmitted data in order to transmit them to a remote server of a network monitoring center.

By way of a reminder, valve boxes are elements covering the generally vertical ducts passing through the ground in order to make a buried pipe easily accessible from the surface, and more specifically the portion of the pipe comprising the supply control valve.

The quality of the transmission can be degraded and/or weakened when the transmitter is far away from the surface, and in particular when the pipe is deeply buried. It therefore can be necessary, for proper transmission of information, to bring the relay antennas closer to the measuring devices and/or to amplify the signal transmitted by the measuring devices. Amplifying the signal transmitted by the measuring devices results in greater energy consumption and can thus reduce the autonomy of the measuring device, which will have to be replaced more often.

Rigidly connecting the transmitter to the plug (or shut-off device) of the duct is generally not desirable, as the transmitter could be damaged by outside stresses applied to the plug, such as vibrations, deformations, etc.

BRIEF SUMMARY

An aim of the present disclosure is to propose a shut-off device for a duct, in which a measuring device comprising a transmitter is housed, preventing the aforementioned disadvantages.

With a view to achieving this aim, a shut-off device for a duct is disclosed herein, in which a measuring device comprising a transmitter is housed, the shut-off device comprising:
  a connecting ring configured to be assembled to the transmitter; and
  a cover configured to close the duct and clip onto the connecting ring and thus rigidly connect the transmitter of the measuring device to the shut-off device.

According to other advantageous and non-limiting features of the present disclosure, taken individually or in any technically feasible combination:
  the connecting ring is configured to prevent any contact between the cover and the transmitter;
  the assembly between the connecting ring and the transmitter has low rigidity in order to limit the transmission of forces;
  the connecting ring comprises a peripheral wall intended to surround a peripheral surface of the transmitter, the peripheral wall of the connecting ring comprising:
    on an inner surface, at least one main retaining notch intended to keep the peripheral surface of the transmitter assembled to the connecting ring; and
    on an outer surface, at least one secondary retaining notch intended to interact with the cover and keep the transmitter assembled to the cover;
  the connecting ring has an inner rim, at least present on a section of the periphery of the peripheral wall capable of coming into abutment against an upper surface of the transmitter when the connecting ring is assembled to the transmitter;
  the rim of the connecting ring is present over the entire periphery of the peripheral wall;
  the main notch and the secondary retaining notch comprise a first inclined plane configured to facilitate the clipping thereof;
  the secondary notch comprises, on a lower end, a second inclined plane configured to allow the cover to be unclipped from the connecting ring;
  the cover comprises:
    an upper wall configured to completely cover the upper surface of the transmitter and to protect it from the external environment; and
    a side wall borne by the upper wall that is configured to surround the peripheral wall of the connecting ring and to allow the clipping thereof,
  the side wall of the cover comprises at least one opening for accommodating the secondary notch and allowing the cover to be clipped onto the connecting ring;
  the connecting ring and the cover comprise indexing means in order to ensure the alignment of the opening of the side wall of the cover with the secondary notch of the connecting ring when they are assembled;
  the connecting ring and the cover are formed from materials having the characteristic of not interacting with the electromagnetic emissions of the transmitter; and the connecting ring is formed from a material having lower rigidity than the material from which the cover is formed.

BRIEF DESCRIPTION OF THE DRAWINGS

Further features and advantages of the present disclosure will become apparent from the following detailed description of example embodiments of the present disclosure, with reference to the accompanying figures, in which.

DETAILED DESCRIPTION

The figures are schematic representations that, for the sake of readability, are not to scale.

General Presentation of the Shut-Off Device

Figure 1:
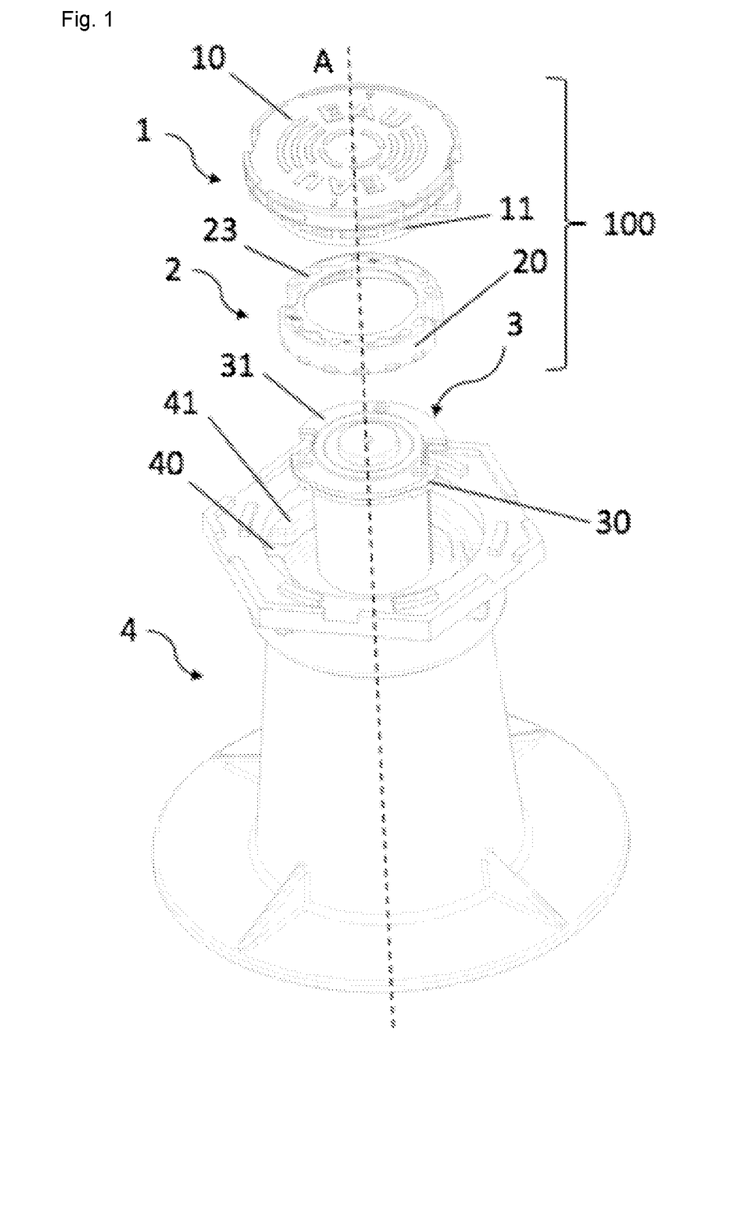
FIG. 1 shows an exploded view of a shut-off device according to the present disclosure, intended to shut-off a duct in which a measuring device comprising a transmitter is housed.

FIG. 1 shows an exploded view of a shut-off device 100 according to the present disclosure, intended to shut-off a duct 4, in which a measuring device (not shown in the figures) comprising a transmitter 3 is housed.

The duct 4 can assume various types, in this case, in FIG. 1, it is a valve box intended to be integrated into a roadway or a sidewalk, but another type of duct also could be contemplated. In general, the shut-off device 100 of the present disclosure can be used to shut-off any type of opening.

The measuring device also can assume various types, for example, it can be a measuring device for the acoustic exploration of pipes for detecting water leaks. In this application scenario, the measuring device can assume the form of a microphone placed against, or in the vicinity of, a pipe to be monitored.

The measuring device is autonomous and, for this reason, comprises a transmitter 3 in order to be able to transmit its measurements. Advantageously, the transmitter 3 is disposed on a movable part of the measuring device. This movable part is separate from the part responsible for the measurements in order to allow greater freedom of placement of the transmitter 3 with respect to this part responsible for the measurement. It is therefore possible to place the transmitter 3 of the measuring device as close as possible to the opening of the duct 4, i.e., of the roadway or of the sidewalk in the case of the described application of the present disclosure, in order to improve the quality of the transmissions. For this reason, the transmitter 3 is kept assembled to the shut-off device 100.

Description of the Shut-Off Device

The shut-off device 100 comprises a cover 1 as well as a connecting ring 2. The connecting ring 2 is configured to be assembled to the transmitter 3. The cover 1 is configured to close the duct 4 and to clip onto the connecting ring 2. The transmitter 3 of the measuring device is thus rigidly connected to the shut-off device 100.

A further role of the connecting ring 2 is to protect the transmitter 3 from outside stresses applied to the cover 1. The connecting ring 2 is thus configured to prevent any contact between the cover 1 and the transmitter 3.

The connecting ring 2 and the cover 1 are advantageously formed from materials having the characteristics of not interacting with the electromagnetic emissions of the transmitter 3. They are therefore non-magnetic and electrically insulating materials, such as plastic materials.

The cover 1 must also be formed from a material that is highly resistant to outside stresses, such as those caused by the passage of a vehicle, in order to preserve its integrity. The material forming the cover 1 is advantageously selected from plastic materials filled with glass fiber, such as polyphthalamide (PPA), polyphenylene sulfide (PPS), polyamide 12 (PA12), polyamide 6 (PA6), etc.

The connecting ring 2 is preferably formed from a material having lower rigidity than the material from which the cover 1 is formed. The hardness of the material forming the connecting ring 2 advantageously ranges between 20 and 70 shore A in order to be able to deform and absorb the shocks and vibrations that would otherwise be transmitted to the transmitter 3. The material forming the connecting ring 2 advantageously is an elastomer.

The shape of the connecting ring 2 is selected to match the shape of the transmitter 3. In the case of the example shown in FIGS. 2A to 2C, the connecting ring 2 is generally annular shaped. It comprises a peripheral wall 20 intended to surround a peripheral surface 30 of the transmitter 3. The peripheral wall 20 of the connecting ring 2 does not necessarily cover the whole of the peripheral surface 30 of the transmitter 3, and it can surround only a portion of this surface, for example, that close to the upper surface 31 of the transmitter 3.

Figure 2A:
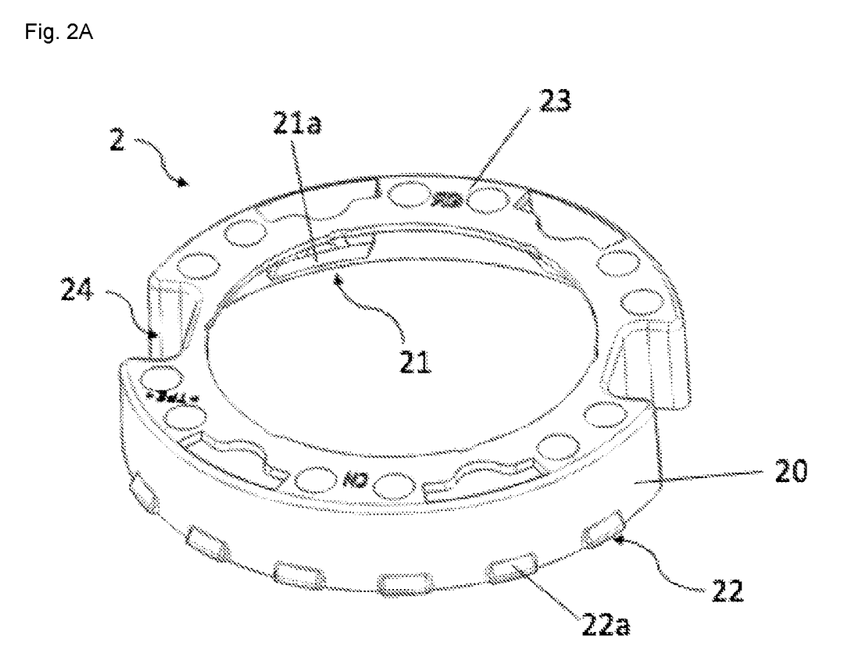
FIGS. 2A to 2C show a connecting ring according to the present disclosure, respectively, as an overall view, as a bottom view and as a side view.
Figure 2B:
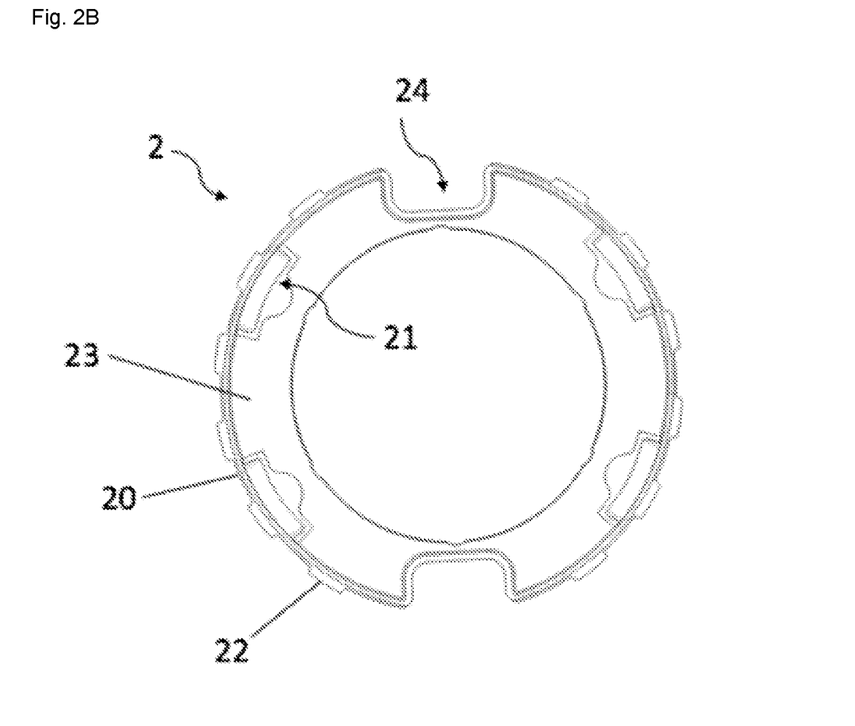
Figure 2C:
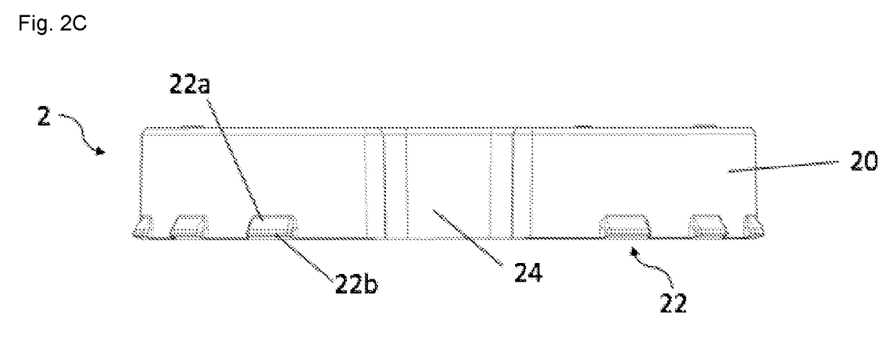

As already stated, the connecting ring 2 is configured to be assembled to the transmitter 3.

The peripheral wall 20 of the connecting ring 2 thus can comprise, on its inner face, at least one main retaining notch 21, in this case four main retaining notches 21, intended to interact with the peripheral surface 30 of the transmitter 3. This can comprise elements, such as notches, cavities, ribs or grooves, in order to allow the main notch 21 to be clipped. In the described example, this element assumes the form of a collar defining a shoulder onto which the main notch 21 of the connecting ring 2 can be clipped. Advantageously, the main notch 21 comprises a first inclined plane 21a in order to facilitate the clipping thereof onto the transmitter 3. Other assembly methods are obviously possible, for example, by "quarter turn" type locking of the connecting ring 2 to the transmitter 3.

The peripheral wall 20 of the connecting ring 2 also comprises, on its outer surface, at least one secondary retaining notch 22, in this case twelve secondary retaining notches 22, intended to interact with the cover 1 and keep the transmitter 3 assembled to the cover 1.

Advantageously, the secondary notch 22 comprises a first inclined plane 22a in order to facilitate the clipping thereof onto the cover 1. The secondary notch 22 can also comprise, on a lower end, a second inclined plane 22b configured to allow the cover 1 to be unclipped from the connecting ring 2. For the sake of clarity, it should be noted that the terms "upper" and "lower" are defined relative to the direction of insertion of the shut-off device 100 into the duct 4, along a main axis A.

By allowing the connecting ring 2 to be unclipped from the cover 1, the integrity of the measuring device is maintained when the shut-off device 100 is opened. This thus avoids damaging the transmitter or the connecting cable connecting it to the rest of the measuring device, when the shut-off device is moved in order to provide access to the duct.

The connecting ring 2 has an inner rim 23, which is at least present on a section of the periphery of the peripheral wall 20. This inner rim 23 is capable of coming into abutment against the upper surface 31 of the transmitter 3 when the connecting ring 2 is assembled to the transmitter 3. As is highly visible in FIG. 2B, the inner rim 23 can be present around the entire periphery of the peripheral wall 20. Alternatively, it can be made up of independent sections, for example, three independent sections. The peripheral wall 20 and the inner rim 23 define a housing for accommodating at least part of the transmitter.

The assembly between the connecting ring 2 and the transmitter 3 has low rigidity in order to limit the transmission of force between these two elements and to allow the clipping thereof. The term "low rigidity" is understood to mean that play can exist, allowing them to move along the main axis A after they are assembled.

Figure 3A:
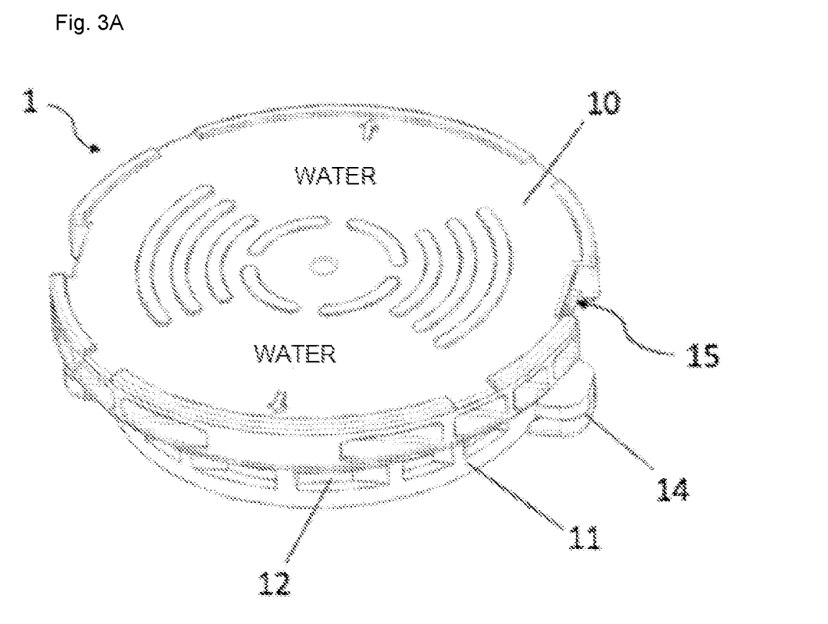
FIGS. 3A to 3C show a cover according to the present disclosure, respectively, as an overall view, as a bottom view and as a side view.
Figure 3B:
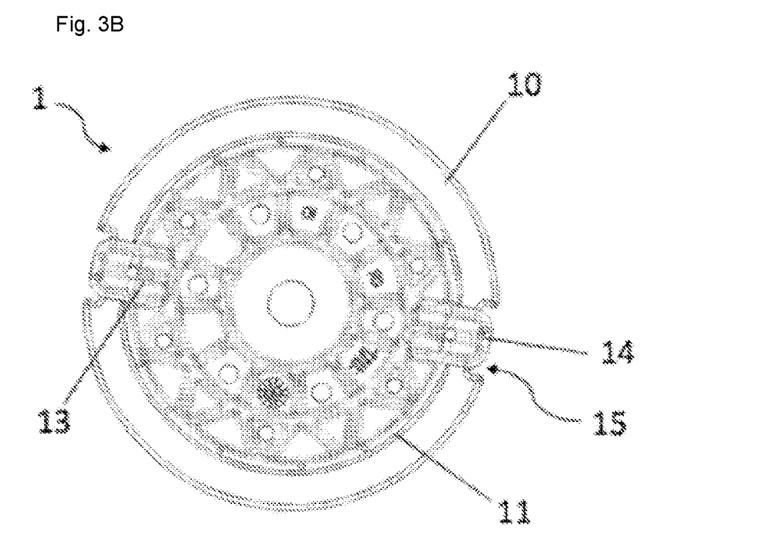
Figure 3C:
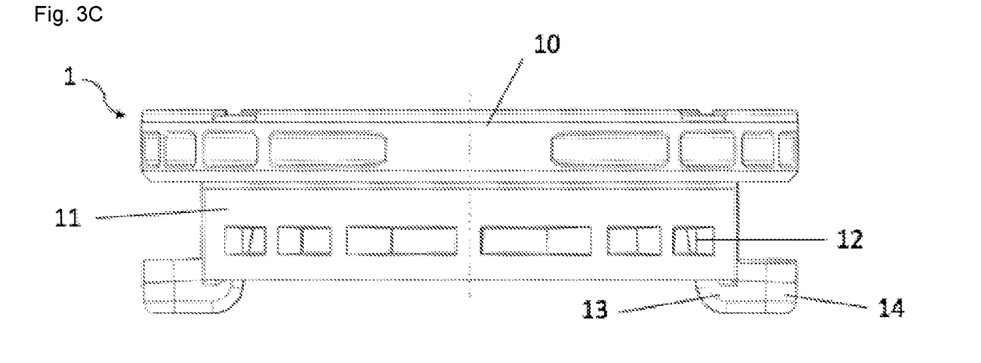

With reference to FIGS. 3A to 3C, the cover 1 comprises an upper wall 10 and a side wall 11. The upper wall 10 is large enough to completely cover the upper surface 31 of the transmitter 3 and to protect it from the external environment.

Advantageously, as shown in FIG. 3B, the lower surface of the upper wall 10 can comprise a plurality of ribs in order to distribute the forces applied to the cover 1 and to improve its rigidity.

Also advantageously, the upper wall 10 has a slightly convex shape in order to prevent the formation of a water film on the cover 1, which could reduce the quality of the electromagnetic transmission. It can be structured to have non-slip properties.

The upper wall 10 can also comprise disassembly notches 15 in order to allow the head of a tool to be introduced between the cover 1 and the duct 4 to facilitate the removal of the shut-off device 100.

Optionally, the upper wall 10 of the cover 1 can comprise extrusions and/or cavities in order to reduce the amount of material used for, as well as the weight of, the cover 1.

The side wall 11 is borne by the upper wall 10. It is configured to surround the peripheral wall 20 of the connecting ring 2 in order to allow the clipping thereof. The side wall 11 comprises at least one opening 12, in this case twelve openings 12, for accommodating the secondary notch(es) 22 of the connecting ring 2.

Advantageously, the connecting ring 2 and the cover 1 comprise indexing means 13, 24 in order to facilitate the alignment of the openings 12 of the side wall 11 of the cover 1 with the secondary notches 22 of the connecting ring 2 when they are assembled. These indexing means in this case are formed by indexing notches 24 disposed on the peripheral wall 20 of the connecting ring 2, as well as by notches 13 disposed on the inner face of the side wall 11 of the cover 1. Alternatively, it is also possible to contemplate using the shape of the connecting ring 2 as an indexing means, by selecting the contour of the peripheral wall 20 so that it does not have symmetry of revolution, for example, a square or rectangular contour.

Optionally, the side wall 11 of the cover 1 also comprises, on its outer face, locking elements 14, in this case lugs 14, allowing the shut-off device 100 to be locked to the duct 4 by quarter-turn rotation. In this case, the duct 4 comprises a rib 41 provided with notches 40 to allow the lugs 14 to pass through and rotate under the rib 41.

Advantageously, the junction between the upper wall 10 and the side wall 11 of the cover 1 forms a shoulder. The lower surface of the upper wall 10 of the cover thus can come into abutment with part of the duct 4 and thus limit the insertion of the shut-off device 100 into the duct 4.

Implementation of the Shut-Off Device

In a first step, the connecting ring 2 is assembled to the transmitter 3. For this reason, the connecting ring 2 is inserted, along the main axis A, on the transmitter 3 in order to clip the main retaining notches 21 on the peripheral surface 30 of the transmitter 3. When the connecting ring 2 is inserted on the transmitter 3, the first inclined planes 21a of the main notches 21 guide the deformation of the connecting ring 2 in order to allow clipping. The insertion of the connecting ring 2 on the transmitter 3 is stopped when the inner rim 23 comes into abutment against the upper surface 31 of the transmitter 3.

In a second step, the cover 1 is assembled to the assembly formed by the connecting ring 2 and the transmitter 3. The cover 1 is inserted, along the main axis A, on the connecting ring 2 so as to make the indexing means 13, 24 coincide in order to align the openings 12 with the secondary notches 22. The first inclined plane 22a of the secondary notches 22 guides the deformation of the connecting ring 2 to allow the secondary notches 22 to be clipped into the openings 12.

Figure 4A:
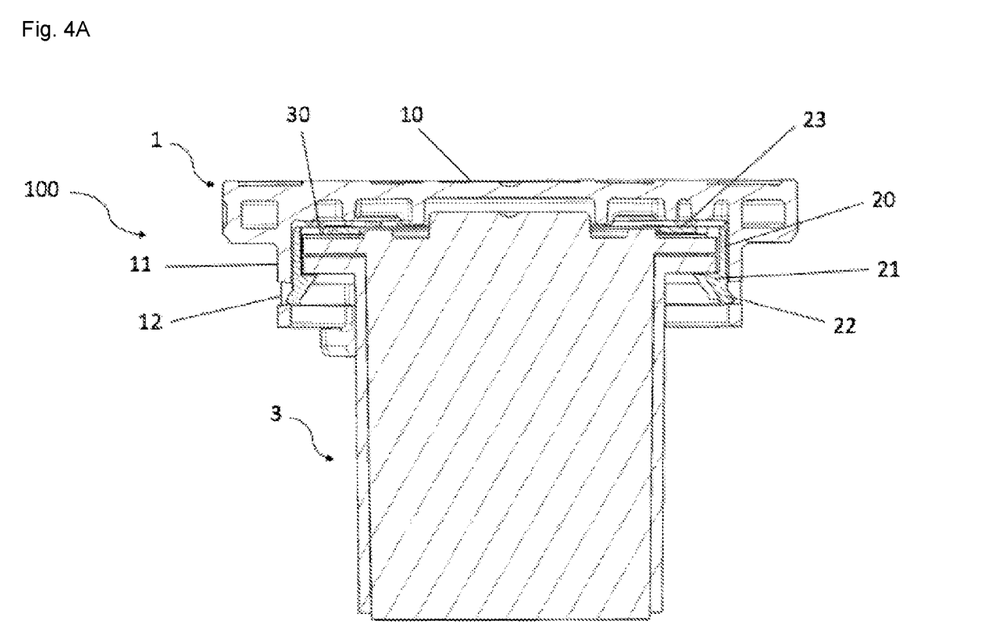
FIGS. 4A and 4B show a shut-off device according to the present disclosure, respectively, as a section view and as a profile view.
Figure 4B:
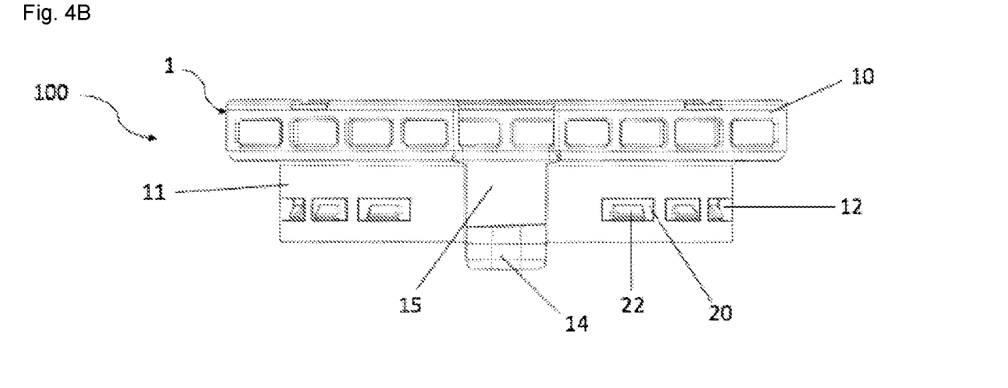

On completion of these two steps, the transmitter 3 is rigidly connected to the shut-off device 100, as shown in FIGS. 4A and 4B. In this configuration, it should be noted that there is no contact between the transmitter 3 and the cover 1 and that movement play, along the main axis A, can exist between the connecting ring 2 and the transmitter 3.

In a third step, the measuring device is installed in the duct 4 and the shut-off device 100 (provided with the transmitter 3) is assembled on the duct 4, for example, by quarter-turn locking. The lugs 14 of the cover 1 are aligned with the notches 40 of the duct 4, when the shut-off device 100 is inserted into the duct 4, then a rotation is applied to the cover 1. This rotation allows the lugs 14 to be rotated under the rib 41 of the duct in order to misalign the lugs 14 with the notches 40 so as to prevent the withdrawal of the shut-off device 100 from the duct 4. The upper wall 10 of the cover 1 comes into abutment, at the shoulder, against the rib 41 in order to limit the insertion of the shut-off device 100 in the duct 4 and to shut-off the duct 4.

On completion of this step, the transmitter 3 is thus disposed as close as possible to the opening of the duct 4 and therefore to the surface. The proximity of the transmitter 3 to the surface, as well as the nature of the materials making up the elements of the shut-off device 100 not interacting with the electromagnetic emissions, allow optimum transmission of the data recorded by the measuring device to be ensured. In addition, the transmitter 3 is protected from the external environment by the cover 1 and by the connecting ring 2, which, by virtue of its flexible nature, attenuates the vibrations and shocks experienced by the cover 1. The transmitter 3 is thus protected from the influence of external disruptions.

Disassembling the shut-off device 100 from the duct 4 involves carrying out the operations of the third step described above in reverse. In this case, it therefore involves applying a rotation to the cover 1 in order to realign the lugs 14 with the notches 40 in order to be able to remove the shut-off device 100 from the duct 4. The end of a tool can be inserted into the disassembly notches 15 of the cover in order to facilitate the rotation of the cover 1.

If an excessive force is exerted on the transmitter 3 during disassembly, for example, in the case where the measuring part of the measuring device to which the transmitter is connected is blocked at the bottom of the duct, the second inclined plane 22b of the secondary retaining notches 22 guides the deformation of the connecting ring 2 in order to separate the connecting ring 2 from the cover 1. The integrity of the measuring device is thus preserved by avoiding pulling the transmitter 3 from the measuring device.

Of course, the present disclosure is not limited to the embodiment described, and it is possible to add alternative embodiments without departing from the scope of the invention as defined by the claims.

The invention claimed is:

1. A shut-off device for a duct, in which a measuring device comprising a transmitter is housed, the shut-off device comprising:
 a connecting ring having a peripheral wall and an inner rim on at least a section of a periphery of the peripheral wall, the connecting ring defining a housing for accommodating at least part of the transmitter; and
 a cover configured to close the duct and clip onto the connecting ring and thus rigidly connect the transmitter of the measuring device to the shut-off device.

2. The shut-off device of claim 1, wherein the connecting ring is configured to prevent any contact between the cover and the transmitter.

3. The shut-off device of claim 2, wherein the connecting ring is configured to assemble with the transmitter with low rigidity to limit transmission of forces from the connecting ring to the transmitter.

4. The shut-off device of claim 3, wherein the peripheral wall of the connecting ring comprises:
 on an inner surface, at least one main retaining notch configured to maintain a peripheral surface of the transmitter assembled to the connecting ring; and
 on an outer surface, at least one secondary retaining notch configured to interact with the cover and maintain the transmitter assembled to the cover.

5. The shut-off device of claim 4, wherein the rim of the connecting ring is present over the entire periphery of the peripheral wall.

6. The shut-off device of claim 4, wherein the at least one main notch and the at least one secondary retaining notch each comprise an inclined plane configured to facilitate the clipping thereof.

7. The shut-off device of claim 4, wherein the at least one secondary notch comprises, on a lower end thereof, an inclined plane configured to allow the cover to be unclipped from the connecting ring.

8. The shut-off device of claim 4, wherein the cover comprises:
 an upper wall configured to completely cover an upper surface of the transmitter and to protect the transmitter from the external environment; and
 a side wall borne by the upper wall configured to surround the peripheral wall of the connecting ring and to allow the clipping thereof.

9. The shut-off device of claim 8, wherein the side wall of the cover comprises at least one opening for accommodating the secondary notch and allowing the cover to be clipped onto the connecting ring.

10. The shut-off device of claim 9, wherein the connecting ring and the cover comprise indexing features configured to ensure alignment of the opening of the side wall of the cover with the secondary notch of the connecting ring when the cover and the connecting ring are assembled together.

11. The shut-off device of claim 1, wherein the connecting ring and the cover are formed from materials that do not interact with electromagnetic emissions from the transmitter.

12. The shut-off device of claim 1, wherein the connecting ring is formed from a material having lower rigidity than a material from which the cover is formed.

13. The shut-off device of claim 1, wherein the connecting ring is configured to assemble with the transmitter with low rigidity to limit transmission of forces from the connecting ring to the transmitter.

14. The shut-off device of claim 1, wherein the peripheral wall of the connecting ring comprises:
 on an inner surface, at least one main retaining notch configured to maintain a peripheral surface of the transmitter assembled to the connecting ring; and
 on an outer surface, at least one secondary retaining notch configured to interact with the cover and maintain the transmitter assembled to the cover.

15. The shut-off device of claim 14, wherein the at least one main notch and the at least one secondary retaining notch each comprise an inclined plane configured to facilitate the clipping thereof.

16. The shut-off device of claim 14, wherein the at least one secondary notch comprises, on a lower end thereof, an inclined plane configured to allow the cover to be unclipped from the connecting ring.

17. The shut-off device of claim 14, wherein the cover comprises:
 an upper wall configured to completely cover an upper surface of the transmitter and to protect the transmitter from the external environment; and
 a side wall borne by the upper wall configured to surround the peripheral wall of the connecting ring and to allow the clipping thereof.

18. The shut-off device of claim 17, wherein the side wall of the cover comprises at least one opening for accommodating the secondary notch and allowing the cover to be clipped onto the connecting ring.

19. The shut-off device of claim 18, wherein the connecting ring and the cover comprise indexing features configured to ensure alignment of the opening of the side wall of the cover with the secondary notch of the connecting ring when the cover and the connecting ring are assembled together.

20. The shut-off device of claim 1, wherein the rim of the connecting ring is present over the entire periphery of the peripheral wall.

* * * * *